(12) United States Patent
Schmid et al.

(10) Patent No.: US 8,801,107 B2
(45) Date of Patent: Aug. 12, 2014

(54) VEHICLE WHEEL

(75) Inventors: Wolfgang Schmid, Freising (DE);
Christoph Kossira, Ingolstadt (DE);
Karl-Heinz Meitinger, München (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 13/983,983

(22) PCT Filed: Jan. 21, 2012

(86) PCT No.: PCT/EP2012/000268
§ 371 (c)(1),
(2), (4) Date: Aug. 6, 2013

(87) PCT Pub. No.: WO2012/107165
PCT Pub. Date: Aug. 16, 2012

(65) Prior Publication Data
US 2013/0313889 A1    Nov. 28, 2013

(30) Foreign Application Priority Data
Feb. 7, 2011 (DE) .......................... 10 2011 010 509

(51) Int. Cl.
*B60B 7/04* (2006.01)
(52) U.S. Cl.
USPC ...................................... 301/37.107; 301/6.3
(58) Field of Classification Search
CPC .............. B60B 7/04; B60B 7/065; B60B 3/10
USPC ........ 301/6.3, 37.25, 37.102, 37.106, 37.107; 188/71.6
See application file for complete search history.

(56) References Cited

U.S. PATENT DOCUMENTS

| 4,593,953 | A  | * | 6/1986 | Baba et al. ..................... 301/6.3 |
| 7,594,567 | B2 | * | 9/2009 | Sabelstrom et al. ...... 188/218 A |
| 7,661,766 | B2 |   | 2/2010 | Davis et al. |

(Continued)

FOREIGN PATENT DOCUMENTS

| DE | 33 40 816 | 9/1984 |
| DE | 38 16 415 | 11/1989 |

(Continued)

OTHER PUBLICATIONS

International Search Report issued by the European Patent Office in International Application PCT/EP2012/000268 on Mar. 27, 2012.

*Primary Examiner* — Kip T Kotter
(74) *Attorney, Agent, or Firm* — Henry M Feiereisen LLC

(57) ABSTRACT

A vehicle wheel includes a wheel rim on which is provided a plurality of plate-like covering elements, which are mounted so as to be pivotable about a pivot axis, for temporarily closing off associated apertures in the wheel rim, wherein each covering element can be displaced along the pivot axis under centrifugal force counter to the force of a restoring element and is connected to the wheel rim by means of a coupling element, which imparts positive guidance during a displacement movement, in such a way that the covering element can be pivoted between a radially inner open position and a radially outer closed position, wherein a pivot axis rod arranged on the outer side of the wheel rim is connected to the covering element via a hydraulic or pneumatic vibration damper.

7 Claims, 3 Drawing Sheets

(56) References Cited

U.S. PATENT DOCUMENTS

| | | | |
|---|---|---|---|
| 7,806,485 B1 * | 10/2010 | Nelson et al. | 301/37.25 |
| 8,322,729 B2 | 12/2012 | Michel et al. | |
| 8,500,133 B2 | 8/2013 | Michel et al. | |
| 2007/0246996 A1 * | 10/2007 | Footit | 301/37.108 |
| 2009/0195053 A1 | 8/2009 | Kruse et al. | |
| 2012/0049469 A1 | 3/2012 | Michel et al. | |
| 2012/0098221 A1 | 4/2012 | Michel et al. | |
| 2012/0126498 A1 | 5/2012 | Michel et al. | |
| 2012/0132020 A1 | 5/2012 | Kunsch et al. | |

FOREIGN PATENT DOCUMENTS

| | | |
|---|---|---|
| DE | 103 06 501 | 9/2004 |
| DE | 102008007690 | 8/2009 |
| DE | 102010034417 | 2/2012 |
| EP | 0 145 487 | 6/1985 |
| EP | 1 288 019 | 3/2003 |
| EP | 1 319 526 | 6/2003 |
| EP | 2 886 214 | 12/2006 |
| FR | 2 699 453 | 6/1994 |
| JP | 61244601 A * | 10/1986 |

* cited by examiner ns filed Jan. 21, 2012,
VEHICLE WHEEL

CROSS-REFERENCES TO RELATED APPLICATIONS

This application is the U.S. National Stage of International Application No. PCT/EP2012/000268, filed Jan. 21, 2012, which designated the United States and has been published as International Publication No. WO 2012/107165 A8 and which claims the priority of German Patent Application, Serial No. 10 2011 010 509.3, filed Feb. 7, 2011, pursuant to 35 U.S.C. 119(a)-(d).

BACKGROUND OF THE INVENTION

The invention relates to a vehicle wheel including a wheel rim on which multiple plate-like cover elements for temporarily closing assigned wheel side apertures are provided, wherein each cover element due to centripetal forced is shiftable along the pivot axis against the force of a restoring element and coupled with the wheel rim via a positively guiding coupling element such that the cover element is pivotal between a radially inner open position and a radially outer closed position.

The conception of modern wheel rims is subject to various, partially conflicting, demands. Beside a simple wheel rim contour, which enables an easy manufacture, a central demand is that the wheel rim allows a maximal air flow through the wheel rim to be able to optimally cool the wheel rim by the air flow when needed. Further, during a residual heating period of the brake disc at standstill, it has to be ensured that the heat can dissipate also in the absence of air flow. This results in the demand for a maximally "open" wheel rim structure.

However, for aerodynamic reasons the wheel rim should be maximally closed, to prevent air turbulences as far as possible, which are generated by openings in the wheel rim. During normal driving, an overpressure exists in the region of the underside of the vehicle, which ensures that air is pushed through the free spaces of the wheel rim. If the wheel rim was configured as closed disc, the cw-value which is included in the calculation of the air resistance of the vehicle could be improved.

In order to meet these requirements which quasi contradict one another on one hand for thermal reasons and on the other hand for aerodynamic reasons, it is known to open and close the wheel rim side openings when needed. In such systems, the plate shaped cover elements are usually pivotally supported and movable radially along the pivot axis. The cover elements are each additionally connected to the wheel rim via a force guiding coupling element. The centripetal force acting on the cover elements increases with increasing rotational speed of the wheel which causes the cover elements to move outwardly starting from a radially inner position in which they open the respectively assigned opening, wherein during this radial movement which is due to centripetal force, the cover elements pivot from the open position into the closed position as a result of the forced guidance via the coupling element. This radial movement occurs against the force of a restoring element, usually a spring which urges the respective cover element radially inwards again which, however, due to the high centripetal forces is overcome and pushed back. When the rotational speed of the wheel decreases again the movement is inverted. The cover elements open automatically via the force guiding coupling element when the decreasing centripetal forces allow the restoring element to cause the cover elements to move radially inward, and to assume their inner position.

A vehicle wheel of the type described above is known from EP 0 145 487 A2. In this wheel, a temperature-controlled actuating element is provided via which the cover elements can be actively moved into the open position in spite of higher driving speeds and radially outwardly closed cover elements when the temperature in the wheel interior is sufficiently high so that a cooling is strictly required. There, temperature controlled actuating elements for example shape memory alloys or bimetal elements are described which deform at sufficiently high temperatures and due the deformation exert a force on the assigned cover element in order to push the cover element against the high centripetal force to thereby push the cover element back via the positively guiding coupling element. This places high demands on the respective thermally controlled actuation elements, which thus have to have the corresponding working capacity.

A vehicle wheel which is improved in this regard is known from the subsequently published German patent application DE 10 2010 034 418.4. There, the positively guiding coupling element is supported against an elasticity on the wheel rim and/or on the cover element or has an integrated elasticity such that the force which is required for moving a cover element from the closed position into the open position is limited. This achieves, that the cover elements are pushed into the open position with a significantly lower force requirement because the required force is limited by the elasticity which is either integrated or situated in the bearing. This elasticity is for example realized by means of a helical spring or by means of rubber bearing rings.

A problem of vehicle wheels of the aforementioned type however is that undesired movements of the cover elements occur during the rotation of the wheel which result from a vertical excitation of the cover elements due to a vertical wheel movement. As described, the cover flaps are shifted between the positions along the pivot axis as a result of centripetal force and thereby are pivoted via the coupling element. When the vehicle drives on an uneven road, the wheel deflects in and out i.e., so that a wheel rim movement which has a vertical movement component is continuously established which in turn causes acceleration forces to act on the cover elements. It is assumed that the cover elements are all moved outwardly as a result of the given centripetal force and are pivoted into the closed position. Incase of a strong and fast deflection of the wheel, the road-proximate cover element is accelerated toward the wheel rim, it's position does not change because as assumed, it is already in the radially outer closed position. The opposing cover element however is accelerated toward the inside of the wheel rim i.e., at a sufficiently high acceleration it is moved from its radially outer closed position toward the inside of the wheel rim, associated with an opening of the aperture via the positively guiding coupling element. A sufficiently fast wheel rotation and relatively strong and high-frequent wheel movement thus results in the centripetal force superimposed accelerations or vibrations, which result in undesired movements of the cover elements. This is undesired from a mechanical point of view because high mechanical stresses on the pivoting coupling bearing result therefrom, and also because of disadvantageous acoustic effects which result from the continuous opening and closing sounds. This effect is also undesired from an aesthetics point of view.

SUMMARY OF THE INVENTION

The invention is thus based on the object to provide a vehicle wheel in which movements of the cover elements which are induced by wheel movements are reduced or avoided.

For solving this problem, in a vehicle wheel of the aforementioned type a pivot axis rod which is arranged on an outside of the wheel rim is connected with the cover element via a hydraulic, pneumatic or friction-based vibration damper.

In the vehicle according to the invention, a hydraulic or pneumatic vibration damper is provided which is connected with a pivot axis rod which is arranged on an outside of the wheel rim i.e., which serves for pivotal support of a cover element on the outside of the wheel rim. The term vibration damper relates to a component which builds up a force against a velocity i.e., that the higher the speed that acts on the damper via an element that is coupled to the damper, the higher is a counteracting force that is built up. This distinguishes a vibration damper from a general elasticity as it is realized for example via a spring or elastic rubber component or the like, with which a force is built up against the path over which this component is deformed. The term vibration damper also includes a friction-based damper i.e., a damper which absorbs energy by friction and thereby dampens the vibration.

As a result of the integration of such a hydraulic or pneumatic vibration damper or friction-based damper on the cover element, the described undesired movements of the cover element can be mostly or almost entirely reduced. When the wheel deflects again, proceeding from the above described assumed example, the cover element which is distal from the road also remains in the radially outward closed position into which it has moved. Because even though the significant acceleration force towards the inside of the wheel rim acts as a result of the deflection of the wheel and would accelerate the cover element with high velocity toward the inside of the wheel rim, an equally high counterforce is built up via the integrated vibration damper according to the invention which counterforce counteracts the acceleration force and retains the cover element in the radially outer position. The greater the acceleration that acts on the vibration damper, the greater is the counterforce built up by the vibration damper.

Because each cover element is supported in a vibration damping manner in the region of the radially outer pivot axis rod via its own vibration damper, the undesired movements of the cover elements that result from strong and fast deflection movements can be mostly or almost entirely be reduced. Because the potential vibrations are compensated by the vibration damper or are evened out to the greatest degree, no perceptible movements of the cover elements occur.

Of course, the integrated vibration dampers do not interfere with the usual radial movements of the cover elements which, from a functional point of view, occur under the influence of centripetal force. When the vehicle accelerates and the rotational speed of the wheels increases, the centripetal force increases, thereby causing the cover elements to move radially outward. This outward radial movement is not prevented by the integrated vibration dampers, but at the most slightly delayed owing to the inertia of the vibration dampers. Corresponding considerations apply in case of a deceleration and associated therewith a reduction of the rotational speed regarding the movement of the cover elements inwardly. This movement is also not prevented by the vibration damper which is also actuated in this case, but at the most slightly delayed.

As vibration damper according to a first embodiment of the invention, a piston-cylinder-damper can be used. Such a damper, whether hydraulic or pneumatic, is based on the principle that the relative movement between piston and cylinder occurs pressure-controlled hydraulically or pneumatically. The movement of the piston in the cylinder requires a displacement of the hydraulic fluid or the air in the cylinder; the countermovement in turn requires the reflux of the hydraulic fluid or air into the cylinder. Via this, an effective vibration damping can be achieved. Expediently, the pivot axis rod is connected with the piston i.e., the piston is preferably arranged in immediate axial extension of the pivot axis rod. The cylinder on the other hand is fixed on the cover element so that—due to the pivot axis rod being pivotally supported but radially fixed in position—a movement of the piston in the cylinder also necessarily results in case of a change of position of the cover element.

In principle, an inverse arrangement would also be conceivable of course such that the pivot axis rod is coupled with the cylinder i.e., the cylinder is radially fixed in position while the piston is coupled with the cover element. The function however is the same.

As an alternative for using a piston-cylinder-damper, a rotational damper can also be used as vibration damper. Also in this case the damping results from a movement-based displacement of a hydraulic fluid or air, however no linear movement results as in the case of piston-cylinder-damper, but rather a rotational movement in the course of which a rotational body is rotated in a housing whereby the hydraulic fluid or air is displaced via the rotation body.

Preferably, the pivot axis rod is connected with the rotation body of the rotational damper in order to convert the linear movement of the pivot axis rod relative to the cover element into a corresponding rotational movement of the rotation body. The housing in which the rotation body is received would in this case again be arranged on the cover element. Likewise, the arrangement can be inverted in this case as well i.e., the housing that receives the rotation body is connected with the pivot axis rod while the rotation body is coupled with the cover element again via an appropriate mechanical coupling to cause the rotation of the rotation body.

In a refinement of the invention it can be provided that when using a friction-based vibration damper, a friction layer is provided on a damper component which is provided on the wheel rim and/or on the cover element, in particular a cylinder which is arranged on the cover element and the pivot axis rod which is arranged on the wheel rim. A usable friction damper has for example a hollow cylindrical mounting on the cover element, into which mounting the fixed pivot axis rod, which is also provided here, engages so that also in this case the second bearing point is realized via this coupling which is formed in the manner of a piston-cylinder-arrangement. In the mounting and/or on the piston pivot rod a friction layer is provided which frictionally and with this dampingly interacts either with the part relative to which it moves or with a further friction layer provided adjacent this part.

BRIEF DESCRIPTION OF THE DRAWING

Further advantages features and details of the invention become apparent from the exemplary embodiments described in the following and by way of the drawing. It is shown in.

DETAILED DESCRIPTION OF PREFERRED EMBODIMENTS

Figure 1:
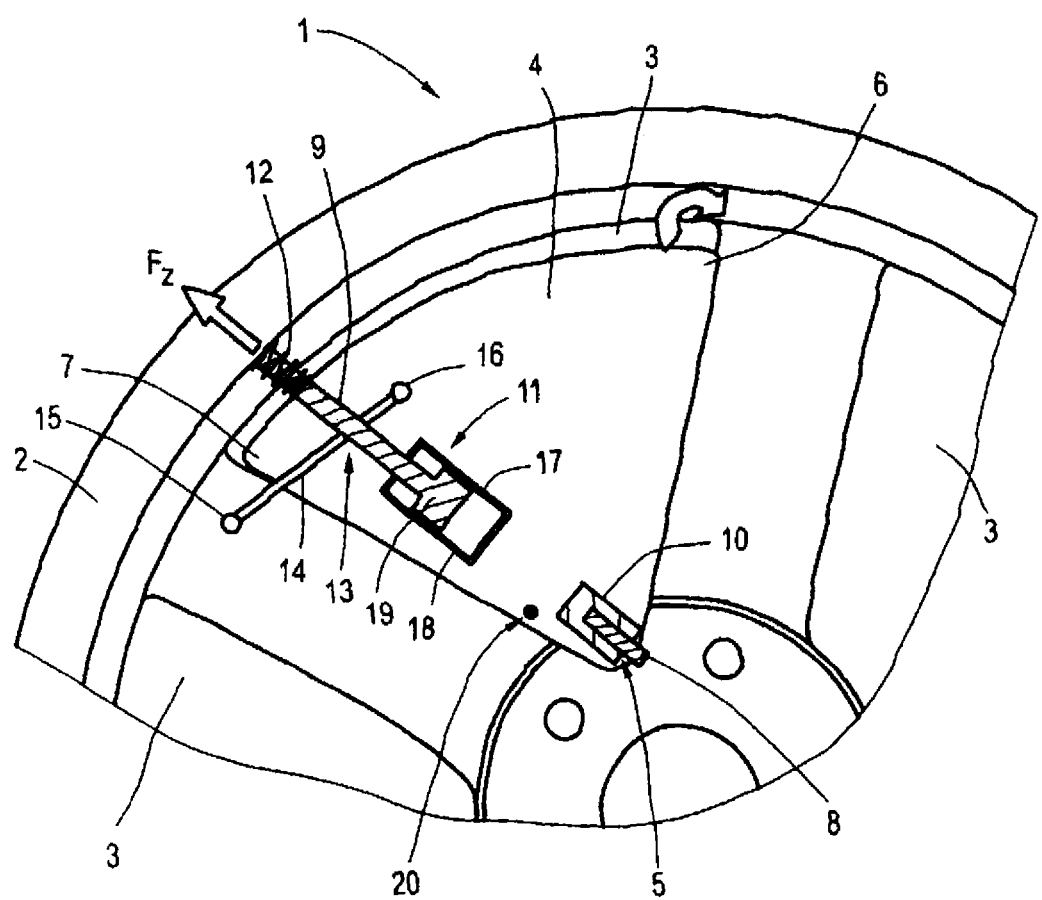
FIG. 1 a schematic diagram of a vehicle wheel according to the invention in partial view with a vibration damper in the form of a piston-cylinder-unit, wherein the cover element is located in the open position in the inner side of the wheel rim, FIG. 2 the vehicle wheel from FIG. 1 in rotation with cover elements which are moved into the radially outer closed position, and FIG. 3 a schematic diagram of a vehicle wheel according to the invention in partial view with a friction based vibration damper.

FIG. 1 shows a representation of a part of a vehicle wheel 1 according to the invention, including a wheel rim 2 on which usually a brake pot and a brake disc which is fastened to the brake pod is fixed or assigned in mounting position. The wheel rim 2 has multiple apertures 3, which serve for ventilation and for esthetic purposes, each of which apertures 3 in the shown example is assigned a plate-like cover element 4, wherein FIG. 1 only shows one such cover element 4. These cover elements 4 serve for closing the aperture expansively and to open the aperture for ventilation when needed.

Figure 2:
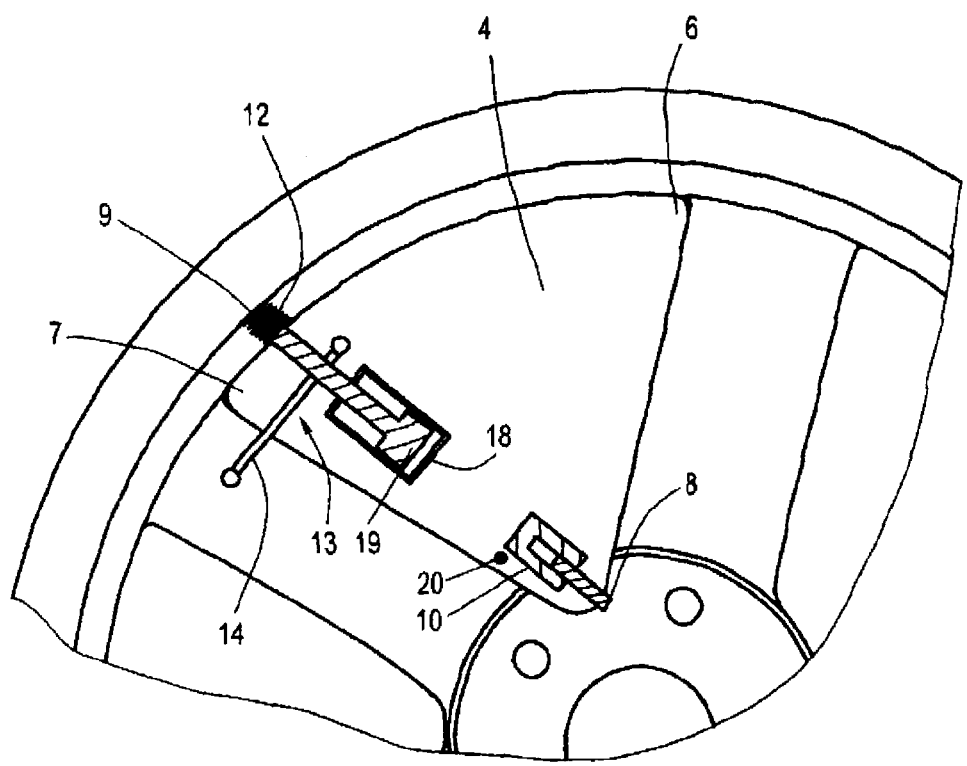

For this, the cover element 4 is pivotal about a pivot axis 5 by several angular degrees, for example 5°-10°. The representation according to FIGS. 1 and 2 is a view of an inner side of the wheel rim 2. The pivotabiltiy of each cover element about the pivot axis 5 is such that each cover element 4 pivots out with its outer corner 6 which in FIG. 1 is on the right hand side toward the inside of the wheel rim i.e., out of the drawing plane toward the observer. The left upper corner 7 on the other hand pivots into the drawing plane i.e., away from the observer toward the outer side of the wheel rim. This is shown in the open position shown in FIG. 1, i.e. the cover element 4 is shown in an open position in which the right upper corner 6 is pivoted inwardly i.e., toward the observer, while the left upper corner 7 is pivoted outwardly i.e., away from the observer. Thus ventilation gaps are formed.

The pivotal support is realized via two pivot axis rods 8, 9 wherein the pivot axis rod 8 is received in a mounting 10 which is arranged on the inner side of each cover element, while the second, radially outer pivot axis rod 9 is coupled with a hydraulic or pneumatic vibration damper 11, which will be explained below. Both pivot axis rods 8, 9 are fixed in position on the wheel rim 2 in corresponding not further shown receptacles.

On the radially outer pivot axis rod 9, a spring element 12 is arranged against which the respective cover element 4 is moved when it moves outwardly. This spring element 12 serves for exerting a restoring force on the cover element 4 when the cover element, due to centrifugal force, moves outwardly during wheel rotation.

Further provided is a coupling element 13 here in form of a rigid rod 14 which is supported on the wheel rim 2 and on the cover element 4 by respective ball joint bearings 15, 16 i.e., it is received by these ball joint bearings 15, 16 relative to the wheel rim 2 or the cover element 4.

Further provided is a preferably thermally controlled actuating element 20 which is here only shown in an outline and which can either be a bimetal actor or a shape memory alloy actor or an expanding material element. This actuating element 20 is provided on the vehicle wheel 1 or is assigned to the vehicle wheel. It can be arranged on the wheel rim or on the brake pod. Via this actuating element 28 pressure is locally exerted on the inner side of the cover element which inner side shown in the Figures. This pressures serves for actively moving the cover element out of a closed position into the opened position i.e., to pivot the cover element about the pivot axis 5 when a ventilation is required due to temperature.

As described, the pivot axis rod 9 is coupled with a hydraulic or pneumatic vibration damper 11. This vibration damper 11 is configured as piston-cylinder-damper 17 including a cylinder 18 which in the shown example is fixedly arranged on the cover element 4, and a piston 19 which is movable in the cylinder 18. The piston 19 is directly connected with the pivot axis rod 9 i.e., so that the pivot axis rod 9 quasi forms the piston rod. Thus, the pivot axis rod 9 engages in the cylinder 18 via a sealed passage opening. Depending on the configuration of the damper, the cylinder 18 is filled with a hydraulic fluid in the case of a hydraulic damper or with air in the case of a pneumatic damper. For enabling the pivot movement of the cover element 4, the cylinder 18 connected to the cover element 4 is rotatable relative to the piston via which the second bearing point is realized.

The vibration damper serves for converting movement energy into heat energy, wherein the damping force generated by the vibration damper increases with increasing movement energy that acts on the vibration damper. The typical principle of function of a for example hydraulic vibration damper is that in case of an axial movement of the piston relative to the cylinder, the hydraulic fluid i.e., for example an oil flows through narrow channels and valves in the piston. As a result of the resistance acting against the oil, pressure-differences are generated which cause the damping forces via active surfaces. This results in a damping work which in turn leads to a heating up of the hydraulic fluid. The damping effect eventually depends on the viscosity of the hydraulic fluid. The principle of function of such a vibration damper, be it pneumatic or hydraulic, is well known. The damping property of such a vibration damper is used for damping undesired vibrations and with this movements of the cover elements.

FIG. 1 shows the vehicle wheel in the resting position or at very low rotational speed. No or only a very low centripetal force acts on the cover elements 4 which are still in the open position.

When the vehicle wheel turns faster i.e., the motor vehicle on which the respective wheel is located drives faster, the acting centrifugal force increases as shown in FIG. 1 with $F_z$. As a result, the individual cover elements 4 move radially outwardly along the pivot axis 5, a radial longitudinal and by a few millimeters to centimeters is inherent in the construction. As a result of the coupling between the wheel rim 2 and cover element 4 which is realized by a the rigid coupling element 13 a pivotal movement which superimposes the longitudinal movement occurs during this radial longitudinal movement which pivotal movement forces the respective cover element 4 into the closed position. The coupling element 13 thus causes a forced movement from the open into the closed position. As can be seen in FIG. 2, the cover element 4 is situated radially slightly further outward, the inner pivot axis rod 8 has slightly moved out of the mounting 10, while the piston 19 is pushed further into the cylinder 18. During this movement, hydraulic fluid or air is pushed out of the cylinder due to the movement of the piston, into the space beyond the piston. The movement resulting purely from the centripetal force is thereby slightly delayed, wherein these radial movements due to the only relatively slowly and steadily increasing acceleration occur relatively slowly anyway.

In the closed position shown in FIG. 2, the right corner 6 and the left corner 7 lie in the respective pivoted-in position, i.e., the aperture 3 is closed in the position that lies in the drawing plane. As a result of the radial movement, the spring element 12 is also compressed and exerts a restoring force on the cover element 4. When now the rotational speed decreases again, when the vehicle brakes, this restoring force results in the respective cover element 4 opening again, when the centripetal force $F_z$ can be overcome again via the restoring force. This again results in a movement of the piston 19 in the cylinder 18, the piston 19 starting from the position shown in FIG. 2 is moved into the outer position shown in FIG. 1, after the cylinder 18 moves inwardly with the cover element 4. This movement is also slightly delayed because again the hydraulic fluid or the gas has to flow from the one cylinder space into the other. Because the centripetal force is normally only built up slowly, this delay is also negligible.

However, when in the situation shown in FIG. 2 in which the cover element is positioned outward due to the high centripetal force, strong deflection of the vehicle wheel 1 occurs, the vibration damper becomes active. It is assumed that the shown cover element is arranged in the vertical upper wheel position, i.e., the pivot axis 5 extends vertically relative to the road. The fast deflection of the wheel thus leads to an acceleration force in the direction toward the road, i.e., this force pushes the cover element 4 in the direction of the inner side of the wheel rim. As a result of the strong deflection, this force is very high i.e., the acceleration of the cover element is significant. This force or acceleration now "pulls" the cylinder 18 together with the cover element 4 toward the inner side of the wheel rim, i.e., pulls the cylinder 18 away from the piston 19. In order to be able to follow this fast movement, the hydraulic fluid or the gas would also have to flow very quickly from one cylinder space into the other. However, this is not the case due to the function of the vibration damper, rather the fluid or gas movement is very slow thereby resulting in the damping property. This means in spite of the momentarily extremely high force or strong acceleration toward the inner side of the wheel rim, the system cannot follow because the flow of the hydraulic fluid or the gas cannot follow as quickly. The acceleration or the movement energy resulting therefrom is converted into heat energy which heats up the fluid or the gas. A significant movement of the cover element 4 is therefore prevented. The acceleration usually also only acts on the cover element 4 for a very short period of time, so that no movement of the cover element results because the vibration damper 11, which is integrated according to the invention dampens or prevents this movement. However, slow movements are possible in spite of the integration of the vibration damper as in the context of the explanation of the purely rotation-related movement outward or inward, however acceleration peaks as they result from fast vertical deflection of the wheel for example when driving over uneven roads, potholes, gravel roads or the like are dampened so that the cover elements 4 retain their respective position.

Figure 3:
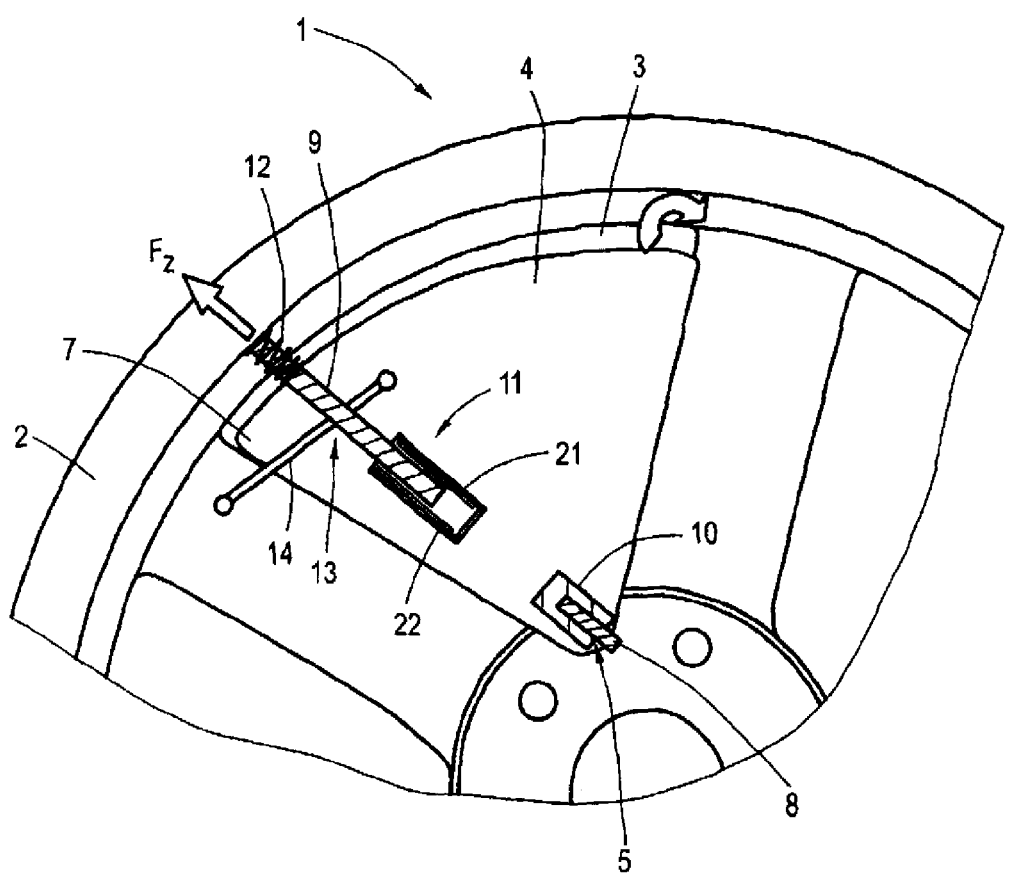

FIG. 3 shows a further vehicle wheel according to the invention whose construction corresponds to the vehicle wheel known from FIGS. 1 and 2 including a wheel rim 2 with apertures 3 and cover elements 4 covering the apertures 3, wherein also here only one is shown. This (as of course also the other not shown ones) is also pivotable about the pivot axis 5, wherein the pivotal support is realized via the pivot axis rods 8, 9. The pivot axis rod 8 also in this case engages in the mounting 10 on the side of the cover element. The second bearing point is also in this case realized via a vibration damper 11, wherein here a friction-based damper is used as the vibration damper whose construction and function is explained in the following. The basic function and movement of the cover elements corresponds to the description given above.

The vibration damper includes a hollow cylindrical mounting 21 which is fastened on the cover element into which the pivot axis rod 9 engages. In case of a movement of the cover element 4 relative to the wheel rim and with this relative to the pivot axis rod 9 which is fixed wheel rim side, the pivot axis rod 9 moves into and out of the mounting 21. A friction layer 22 is applied onto the inside of the mounting 21. As an alternative or in addition such a friction layer can also be applied on the outside of the pivot axis rod 9. The pivot axis rod 9 now runs on this friction layer thereby resulting in friction and with this energy conversion in case of a relative movement. This causes damping of the vibration. Instead of the shown arrangement with a friction damper which interacts with the pivot axis rod it is also conceivable to connect the vibration damper with the coupling element 13.

Instead of the piston-cylinder-damper described in the Figures, it is also conceivable to use for example rotational vibration dampers. These are also based on a displacement principle, however not through an axial movement but through a rotational movement. The effect however is the same.

Use of the vibration damper integrated according to the invention is however not only useful when great road related accelerations act on the wheel or the cover elements. It is also useful when for example the cover elements have just moved to the radially outer closed position due to centripetal force i.e., when the centripetal force is just sufficient to overcome the spring element. For this, the vibration damper 17 was also previously "actuated" in so far it permitted this movement albeit slightly delayed. The cover elements 4 however are not yet in a stable condition because the centripetal force is not overly high. Rather, small changes in driving speed can cause the centripetal force to be reduced again and the compressed spring elements urge the cover elements inward again. This is prevented however via the integrated vibration dampers in so far as this return movement if at all occurs only very delayed. This means that in such quasi instable moments a short decrease of the centripetal force does not immediately result in the cover elements 4 moving into the closed position, this is counteracted by the vibration dampers. A short-time change of the centripetal force is thus in this case also compensated via the vibration dampers so that the cover elements remain in their outer position. Only when the centripetal force remains low over a longer period of time and the cover elements can overcome the centripetal force, the cover elements 4 slowly move inward.

What is claimed is:

1. A vehicle wheel comprising:
   a wheel rim having apertures;
   multiple plate-like cover elements provided on the wheel rim for temporarily closing the apertures, each said cover element being supported pivotal about a pivot axis, and displaceable along the pivot axis as a function of centripetal force against a force of a restoring element;
   a coupling element connecting the cover element with the wheel rim, said coupling element positively guiding the cover element upon displacement of the cover element along the pivot axis such that the cover element is pivotal between a radially inner open position and a radially outer closed position; and
   a pivot axis rod arranged on an outside of the wheel rim and connected with the cover element via a hydraulic, pneumatic or friction-based vibration damper.

2. The vehicle wheel of claim 1, wherein the vibration damper is constructed as a piston-cylinder-damper.

3. The vehicle wheel of claim 2, wherein the pivot axis rod is connected with a piston of the piston-cylinder-damper.

4. The vehicle wheel of claim 1, wherein the vibration damper is constructed as a rotational damper.

5. The vehicle wheel of claim 4, wherein the pivot axis rod is connected with a rotation body of the rotational damper.

6. The vehicle wheel of claim 1, wherein the vibration damper is constructed as friction-based vibration damper and a component of the friction based damper is provided on the wheel rim and/or the cover element, and a friction layer is provided on the component of the friction-based damper and/or on the pivot axis rod.

7. The vehicle wheel of claim 6, wherein the component of the friction-based damper is arranged on the cover element and is constructed as a cylinder.

\* \* \* \* \*